F. A. SIMONDS.
HOISTING DEVICE FOR MOTOR VEHICLES.
APPLICATION FILED APR. 14, 1913.

1,106,684.

Patented Aug. 11, 1914.
5 SHEETS—SHEET 1.

Witnesses
Harold O. Van Antwerp
Palmer A. Jones

Inventor
Frank A. Simonds
By Luther V. Moulton
Attorney

Fig. 3.

F. A. SIMONDS.
HOISTING DEVICE FOR MOTOR VEHICLES.
APPLICATION FILED APR. 14, 1913.

1,106,684.

Patented Aug. 11, 1914.
5 SHEETS—SHEET 5.

Witnesses
Harold V. Van Antwerp
Palmer A. Jones

Inventor
Frank A. Simonds
By Luther V. Moulton
Attorney.

UNITED STATES PATENT OFFICE.

FRANK A. SIMONDS, OF GRAND RAPIDS, MICHIGAN.

HOISTING DEVICE FOR MOTOR-VEHICLES.

1,106,684.  Specification of Letters Patent.  Patented Aug. 11, 1914.

Application filed April 14, 1913. Serial No. 760,993.

*To all whom it may concern:*

Be it known that I, FRANK A. SIMONDS, a citizen of the United States of America, residing at Grand Rapids, in the county of Kent and State of Michigan, have invented certain new and useful Improvements in Hoisting Devices for Motor-Vehicles; and I do hereby declare the following to be a full, clear, and exact description of the invention, such as will enable others skilled in the art to which it appertains to make and use the same.

My invention relates to improvements in hoisting devices for motor vehicles and the like, and its object is to provide a device of this character, which will be automatic in operation, deriving its power for lifting the automobile from the driving wheels of the same, to provide a device which is simple in construction, positive and effective in operation and to provide the same with various other new and useful improvements as hereinafter more fully described and particularly pointed out in the claims.

The hoisting device embodying this invention is adapted to raise the motor vehicle so that all four of its wheels will be entirely free of the floor, thus removing all weight from the tires while the machine is out of use, and permitting the wheels to be freely rotated for various obvious reasons desirable in testing the mechanism of the machine, removing tires from the wheels, etc., and the device is so constructed that its operation is entirely automatic, it being merely necessary for the driver of the motor vehicle to drive the same into position on the hoisting device and by keeping the engine of the motor vehicle in motion and the rear wheels of the machine turning, these rear wheels which rest upon rotatable rollers forming a part of the hoisting device will transmit their power to the operating mechanism which will immediately be automatically brought into position to engage the axles of the motor vehicle, and to raise the same sufficiently to remove the wheels from the floor and will automatically stop raising the machine at a certain predetermined height, even though the driving wheels of the automobile continue to rotate. When the driver desires to lower the motor vehicle and remove it from the hoisting device, it is only necessary for him to reverse the rotating of the driving wheels and this reversed rotation will be transmitted through the driving rollers of the device and will lower the motor vehicle until the wheels engage the floor and it will then immediately back off from the hoisting device, the lifting members of which will automatically tip out of the way, so that they will not interfere with the under parts of the automobile as it passes over them. The device is also provided with various other novel features of arrangement and construction, which will more fully appear by reference to the accompanying drawings, in which:—

Like numbers refer to like parts in all of the figures.

The device is provided with two sets of power transmitting rollers, 1 and 2. The rear roller 1 of each set being journaled in standards extending upward from a base plate 3, while each forward roller 2 is journaled in the free ends of swinging arms 4. The device is also provided with four lifting members 5 and 6, two of which are adapted to engage opposite ends of the rear axle of the motor vehicle while the other two engage opposite ends of the front axle thereof. Each lifting member is provided with mechanism for operating it and this mechanism derives its power from the power transmitting rollers 2, which are engaged by the tires of the rear wheels of the automobile, and this power is transmitted through flexible shafts and gears to each lifting unit.

Owing to the equalizing mechanism or what is commonly known as the differential gear, which is used in the rear axle of most motor vehicles, which permits one wheel to rotate freely should resistance be applied to the opposite one, it is necessary to engage both rear wheels of the motor vehicle in order to obtain a positive driving movement, hence the rollers 1 are directly connected and caused to rotate simultaneously by a shaft 7 extending between them and the rollers 2, which are the driving rollers proper, are each connected by flexible shafting 8 and universal joints 9 to opposite ends of a shaft 10, this shaft 10 being journaled in the base plates 11 of the rear lifting units and extending between them. The shaft 10 is provided near one end with a worm 12, which meshes with a worm gear 13 fixed to a shaft 14, which is journaled in bearings on one of the base plates 11. The worm gear 13 is provided with bevel gear teeth 15, which mesh with a bevel gear 16 on a shaft 17 journaled in bearings on the base 11, and this shaft 17 extends to the opposite rear lifting unit and is provided with a bevel gear 18 on its opposite end, which meshes with a bevel gear 19 fixed to a shaft 14, similar to the one in the opposite lifting unit. The shaft 17 is also provided with a bevel gear 20 which meshes with a bevel gear 21 fixed to the end of a shaft 22 which extends to one of the forward lifting units and is provided on its forward end with a bevel gear 23 meshing with a bevel gear 24 fixed to a shaft 25. The shaft 25 extends between the two forward lifting units being journaled at its respective ends on the base plates 11 of said units and it is provided at each end with a bevel gear 26, each of which gears meshes with a bevel gear 27 fixed to a shaft 14, said shaft also being journaled on base plates 11 similar to those in the rear lifting units. By this system of gearing and shafting, the power derived from the driving rollers 2 is transmitted to each of the four lifting units so that they will act simultaneously.

The lifting members 5 and 6 are substantially screw jacks mounted in pivoted frames 28, these frames being pivotally connected to the base plates 11 and adapted to swing backward and lie close to the floor when out of operation and when raised to operative position the forward sides are supported by arms 29 which rest in sockets 30, these sockets being preferably formed on the upper sides of the bearings of the shafts 14. Each lifting member 5 and 6 is vertically slidable in its frame 28 and is actuated by a screw 31, which is threaded longitudinally into it. The lower end of this screw is rotatively supported in the frame and projects through the lower side thereof, and is provided on its lower end with a beveled gear 32. When the lifting member is in operative position, the bevel gear 32 meshes with a bevel pinion 33 fixed to the end of the shaft 14, and as the shaft 14 is rotated the lifting member will be raised or lowered according to the direction of the rotation of the said shaft.

Figures 8, 9, 10:
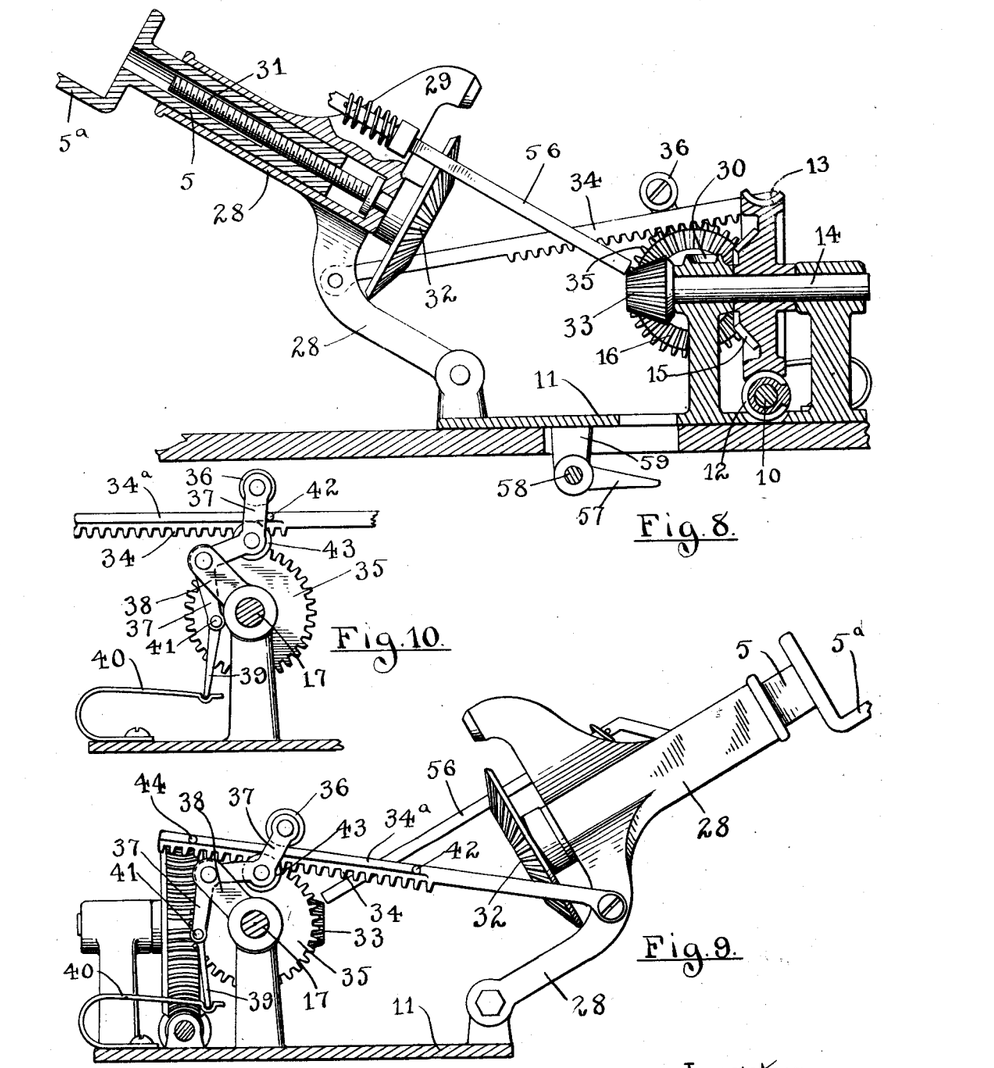
Fig. 8 is a vertical section through one of the lifting units.
Fig. 9 is a vertical section of the same, parts shown in Fig. 8 viewed from the opposite side.
Fig. 10 is a detail of the rack bar operating mechanism, showing the rack bar raised from engagement with the gear wheel.
Figure 11:
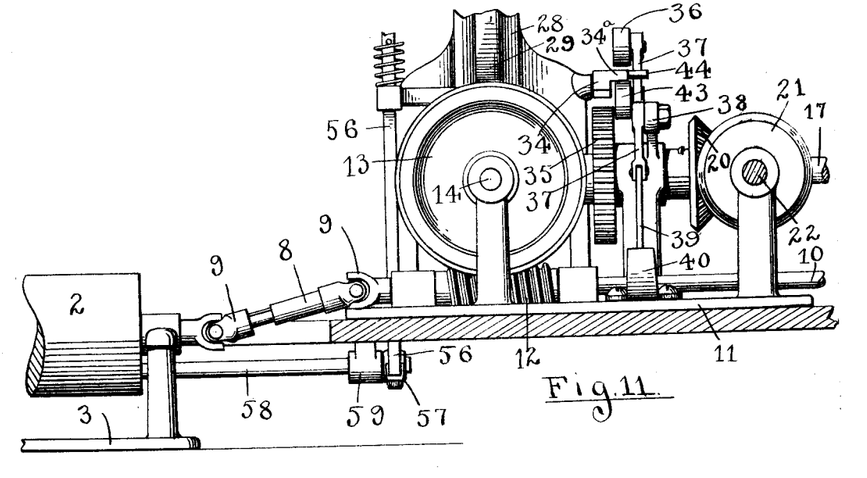
Fig. 11 is a front elevation of one of the lifting members and mechanism for operating the same.
Figure 12:
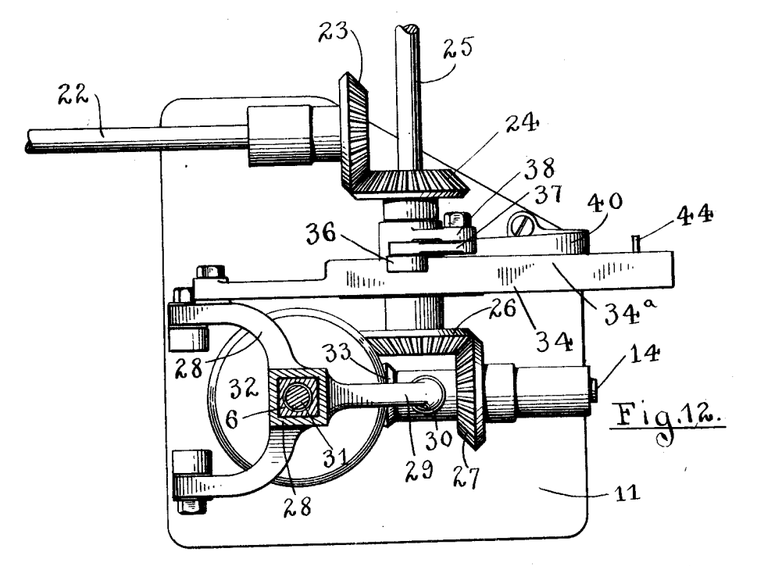
Fig. 12 is a plan view of one of the lifting units for the front of the car, together with its operating mechanism.

The frames 28 which carry the lifting members are pivoted so that the said lifting members may be tipped down close to the floor when the automobile is driven into position or removed from the hoisting device and means are provided to allow the said lifting members to tip backward as the machine moves off from the device and for raising them to place after the machine has been driven into position to be hoisted. For this purpose, each frame has pivotally attached to it, a rack bar 34 and this rack bar is provided on its lower edge with gear teeth which mesh with a gear 35, one of which is provided for each lifting unit, those of the rear units being fixed to the shaft 17 while those of the forward units are attached to the shaft 25. Each rack bar is held in mesh with its gear 35 by means of a depressing roller 36 which is mounted at one end on a bell crank lever 37. This bell crank lever is pivotally attached to an arm 38 which projects preferably from one of the bearings in which the shaft 17 (or 25) is journaled. The end of the bell crank lever 37 opposite the one which carries the roller 36 extends downward and has attached to its lower end, a toggle lever 39, which is engaged at its lower end by a spring 40 which exerts an upward pressure upon it. When the rack bar is in mesh with the gear 35, the pivotal connection 41, between the toggle lever 39 and the lower end of the bell crank lever 37, is offset from a direct line between the pivot of the said bell crank and the lower end of the toggle lever and the upward thrust of the spring 40 tends to maintain the bell crank lever 37 in this position and to hold the rack bar in mesh with the said gear 35. The parts are shown in the above described position in Fig. 9 and this is the position they assume while the frame 28 is being raised, and as it reaches a vertical position and comes to rest, a pin 42 projecting from the side of the rack bar, engages the bell crank lever 37, moves it about its pivot, and swinging its lower end or the pivot point 41 between the center of the bell crank pivot and the lower end of the toggle lever 39 and the spring 40, automatically moves the said lower end of the bell crank lever to the limit of its movement in this direction. As this movement takes place, a lifting roller 43 which is also attached to the bell crank lever and engages the under surface of a flange 34ª of the rack bar, rises and lifts the said rack bar out of engagement with the gear 35. The frame now rests in its normal operative position, being supported at its forward end by the arm 29 and the gear 35 may rotate freely. The frame operating mechanism remains in this position while the car is being raised and lowered and after the car has been lowered and moves backward from the hoisting device, the upward extensions 5ª and 6ª at the upper ends of the lifting members, will be engaged by the axles of the car and the frames will be tipped backward. They are free to do so because the rack bar 34 is held out of engagement with the gear 35 by the lifting roller 43, and as the frame moves backward and downward the rack bar traverses the roller 43 and near the end of its movement, a pin 44 projecting from the side of the rack bar, engages the bell crank lever 37 and trips it back to its former position, whereupon the depressing roller 36 re-engages the upper surface of the rack bar and again draws the same into mesh with the gear 35 so that when the machine is again driven into place upon the hoisting device and the shafts 17 and 25 rotate, the frames will immediately be drawn to an upright position.

The power transmitting units which contain the driving rollers 2, one of which is provided for each driving wheel of the car are preferably located in a depression in the floor, so that only a portion of the rollers project above the surface thereof so that the car may be easily driven into place.

In order to provide a tractive resistance for the driving wheels of the automobile when the car is driven into place on the device, it is necessary to hold the rear set of rollers 1 stationary until the rear wheels of the car have moved into place so that the tires thereof are supported by both sets of rollers 1 and 2. This is accomplished by providing a band brake 45 which surrounds each of the rollers 1 near one of its ends, and this band brake is operated by a brake lever 46 pivoted in a boss 47 projecting upward from the base plate 11, and the forward end of the brake lever engages the surface of a cam 48, this cam being attached to a shaft 49. A friction roller 50 is also attached to the shaft 49 and this friction roller is provided with a depression 50ª in its periphery and the roller is so located that it will frictionally engage the forward driving roller 2, rotation of which will rotate the said friction roller, together with the cam 48. When the car is driven on to the device the friction roller engages the driving roller and the cam depresses the brake lever locking the idler roller but as soon as the tire engages the driving roller and rotates it the friction roller is rotated until the depression 50ª comes opposite the driving roller. This rotates the cam 48 and releases the brake lever allowing its forward end to rise and loosen the brake band so that the idler roller 1 may rotate freely. After the depression 50ª reaches the driving roller the friction roller ceases to rotate and remains inoperative while the car is being raised and lowered. As the driving wheels of the car continue to rotate and their tires frictionally engage the rollers 1 and 2, they will of course, be rotated by this frictional engagement and this rotation will be transmitted from the driving rollers 2 through the flexible shafts 8 and universal joints 9, to the shaft 10 and thence by means of the various gearing and shafting above described, to each of the lifting units and as they operate to raise the car, the driving rollers 2, which are mounted in the swinging arms 4, follow the tires upward in order to maintain the driving rotation. The forward ends of the arms 4 are caused to rise by means of gear segments 51 provided thereon, these gear segments being in mesh with small gears 52 fixed to a shaft 53 which is journaled in bearings on the base plate. Each of these shafts 53 is provided with a spring 54 which is coiled about it, one end of said spring being attached to the shaft while the other end is fixed to a stationary part of the device preferably the bearing for the shaft. This spring tends to rotate the shaft 53 and exerts sufficient force to press the driving rollers 2 against the tires of the wheels, as they rise, to cause them to be frictionally rotated. When the car is raised to its desired height, extensions 4ª on the arms 4 strike fixed stops 55 which prevent further raising of the driving rollers 2 and consequently the frictional engagement between the said rollers and the tires of the car, is diminished until there ceases to be enough friction to rotate the rollers to raise the car farther. The hoisting mechanism offers much more resistance while raising the car than when lowering the same, and consequently the frictional engagement between the tires of the driving wheels and the driving rollers 2 must be greater when raising the car than when lowering it. As above stated the car having been raised until the resistance offered by the the hoisting mechanism is greater than the frictional engagement between the tires and driving rollers, the car will be raised no farther, but when the rotation of said driving wheels is reversed the frictional contact required to lower the car being much less than that for raising it, the driving rollers 2 will immediately start to rotate in the opposite direction and will transmit this oppositely rotative motion through the train of gears and shafting to each of the lifting members and the car will be lowered to the floor. As it reaches the floor and the front wheels rest thereon while the rear wheels are rotatably supported by the rollers 1 and 2 they will continue to rotate to lower the lifting members 5 and 6 until they are entirely free from the axles and as this occurs, the plates on the upper ends of the rear lifting members 5, will engage the upper ends of push rods 56 which are slidably mounted in the frames 28. The lower end of each push rod engage a lever 57 fixed to a rock shaft 58 and this rock shaft extends from the lifting unit to the adjacent driving unit, being journaled in bearings 59 on the base plates 11. The rock shaft 58 has attached to it a spring finger 60 which is adapted to engage a pin 61 which projects from one end of the friction roller 50, and as this shaft is rotated by means of the lever 57 as it is engaged by the push rod 56, the finger 60 by engagement with the pin 61 rotates the friction roller 50 sufficiently to reëngage its periphery with the driving roller 2 whereupon the friction roller is rotated, together with the cam 48 which engages and depresses the forward end of the brake lever 46 and tightens the brake band 45 about the rear frame 1 and prevents it from rotating. This roller now being stationary, affords a tractive resistance to the driving wheels of the automobile and they immediately ride over the said rollers and the car is backed off from the device.

A retaining hook 62 is loosely mounted upon the shaft 58 and is provided with a downwardly extending finger 63 which is engaged by the brake lever 46 when the same is raised and holds the hook out of engagement with a pin 64 projecting from the arm 4, but when the brake lever is depressed the finger 63 is released and a spring 65 draws the hook 62 into engagement with the pin 64 and holds the arm 4 in lowered position against the action of the spring 54, which has a constant tendency to raise the said arm through the gear 52 and segment 51 above described. The driving rollers 2 are thus retained in lowered position when the car is moved from the device. As the first action of the mechanism when the car is driven on to the device, is to release the brake lever 46 which immediately engages the finger 63 and disengages the hook 62 from the pin 64, the arms 4 which carry the driving rollers 2 are free to rise as soon as the car begins to do so.

Figure 1:
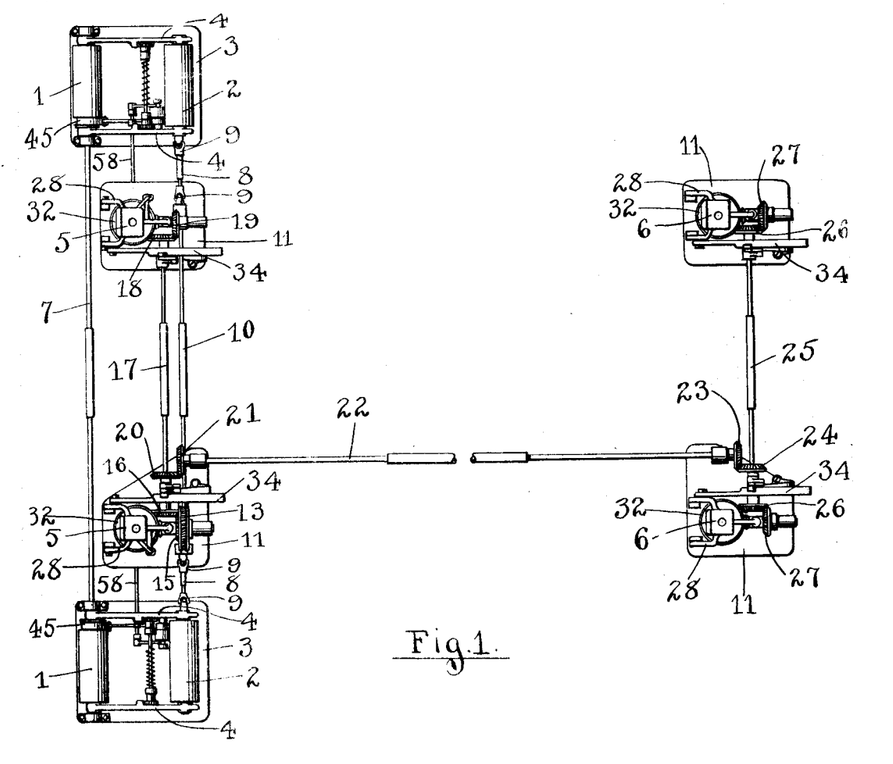
Figure 1 is a plan view of a hoisting device embodying my invention.
Figure 2:
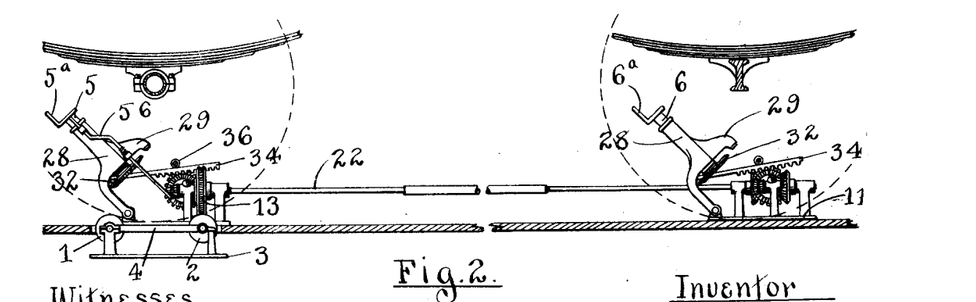
Fig. 2 is a side elevation of the same showing the axles of a motor vehicle in position ready to be engaged by the lifting members.
Figure 3:
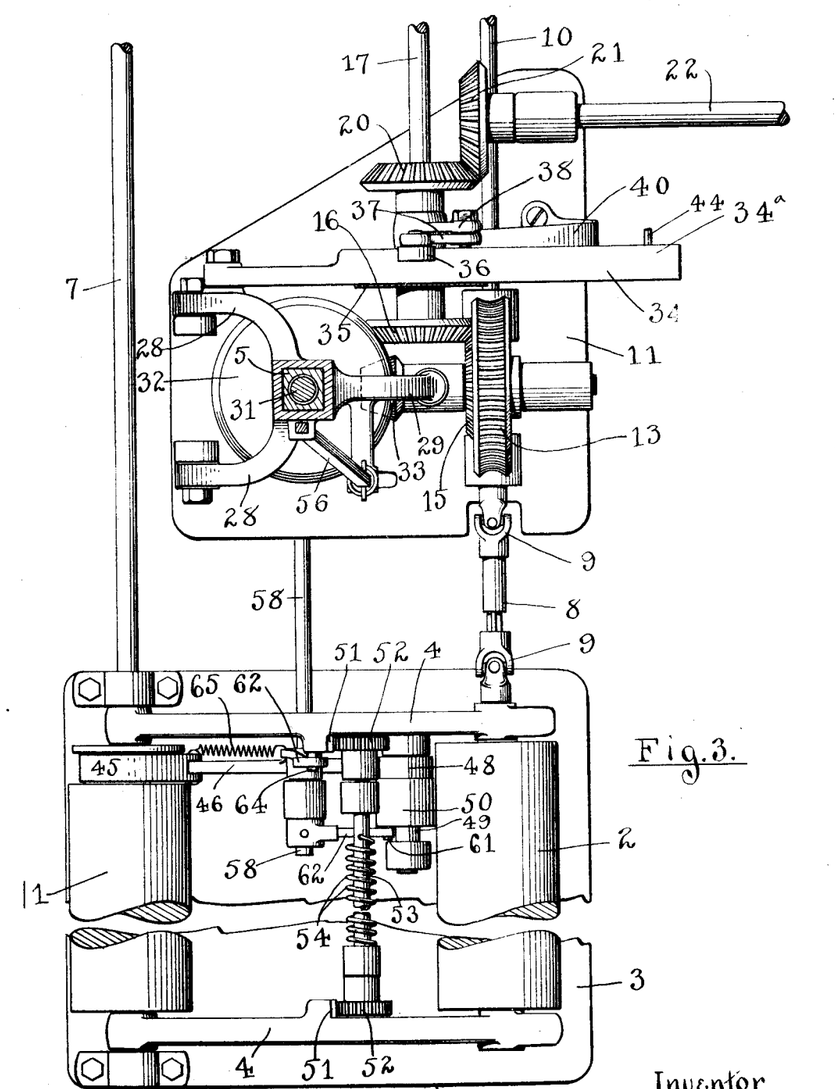
Fig. 3 is an enlarged plan view of one set of power transmitting rollers and one of the lifting \*rs, together with the mechanism for operating the same, the mechanism shown in this figure being the principle driving mechanism for the whole device.
Figures 4, 5:
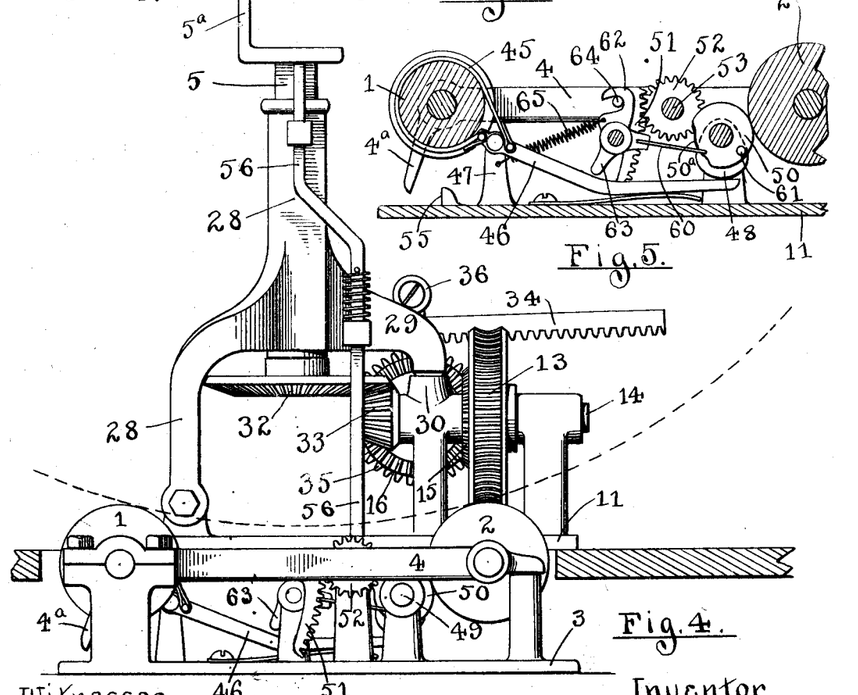
Fig. 4 is a side elevation of one set of power transmitting rollers and one of the lifting units and mechanism for operating the same.
Fig. 5 is a vertical section of one set of power transmitting rollers showing the movable roller held in lowered position.
Figure 6:
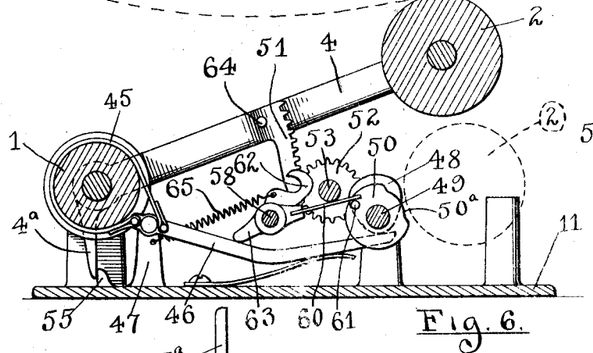
Fig. 6 shows the same mechanism as Fig. 5, with the movable roller raised to follow the tire of the automobile.
Figure 7:
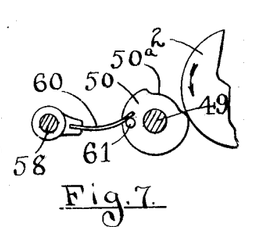
Fig. 7 is a detail showing the operation of the spring finger for throwing the friction roller into engagement with the power roller.

When the car is first driven into position to be raised, the frame 28, the rear ones of which carry the push rods 56, are tipped backward and the said push rods are disengaged from the levers 57, consequently the shaft 58 and the spring finger 60 on the opposite end thereof, are freely movable and as the driving wheels engage the driving rollers 2 and the friction roller 50 is rotated, together with the cam 48, to release the brake lever 46, the pin 61 will engage and lift the spring finger 60. Now, as the frames 28 are raised to operative position, the push rods 56 will be brought into place and their lower ends which are still depressed, will engage the levers 57 and tend to return the friction roller 50 to its former position. This is prevented however, by the edge of the periphery of this roller next to the depression 50ª therein, striking the surface of the driving roller and the spring finger 60 will yield as shown in Fig. 7, to permit the levers 57 to be depressed. The parts remain in this position only until the car has raised sufficiently to release the push rods and free the levers 57.

The operation of the device is as follows: The automobile is driven into position on the hoisting device, the front wheels first passing over the driving rollers 1 and 2, and the rear wheels losing their tractive effort as soon as they engage the driving rollers 2, which are at all times freely rotative, the driving wheels continue to rotate and by frictional engagement, rotate the driving rollers 2. The first movement rotates the friction roller 50 until the depression 50ª therein, reaches the driving rollers 2, whereupon the rotation of the roller 50 stops. This movement has also rotated the cam 48 and released the free end of the brake lever 46 and loosened the brake band 45 so that the rear rollers 1 may rotate freely and finger 63 is engaged by the brake lever 46 as it rises, which disengages the hook 62 from the pin 64 and releases the arms 4 which are then thrust upward under tension of the spring 54, which acts through the gears 52 and segments 51 and holds the driving rollers 2 in yieldable engagement with the tires of the driving wheels of the car. As the driving rollers are rotated, their rotary movement is transmitted by the flexible shafts 8 and universal joints 9 to the shaft 10, and thence through the various bevel gears and shafts to each of the lifting units and rotates the shafts 17 and 25. The gears 35 which are mounted upon the shafts 17 and 25 rotate and the rack bars 34, which are held in mesh with the said gears by the depressing rollers 36, raise the frames 28 to a vertical or operative position, and as they reach this position the pins 42 strike the bell crank levers 37 and shift the position of the same and disengage the rack bars from the gears 35, as heretofore described. When the frames 28 reach their operative position, they are supported by the arms 29, and the gears 32 mesh with the pinions 33 which are rotated from the driving rollers and they immediately start to rotate, turning the screws 31 to raise the lifting members 5 and 6. As these rise, they engage the axles of the car and lift the same bodily from the floor and as the wheels rise, the driving rollers 2 follow the rear wheels upward until stopped by the projection 4ª which engages the stops 55. This reduces the frictional contact between the friction rollers and the tires of the driving wheels until it is insufficient to raise the car farther. When the driver sees that the car has reached the limit of its upward movement, he may stop the engine and leave the car in this position or if so desired, he may continue to run the engine to test the different parts of the mechanism of the automobile.

When it is desired to lower the car and remove it from the hoisting device, the driver starts the engine and reverses the rotation of the driving wheels and owing to the lesser resistance required to lower the car, the driving rollers will be rotated in the reverse direction which will reverse the rotation of the entire mechanism and will lower the car to the floor. After the car has reached the floor and the lifting members 5 and 6 are lowered still farther to release them from the axles the push rods 56 will be engaged by the plates at the upper ends of the rear lifting members and will depress the levers 57, and the spring fingers 60 will engage the pins 61 and reëngage the peripheries of the friction rollers 50 with the driving rollers 2 and they will immediately rotate, together with the cams 48, to depress the brake bands 45 about the drums 1, stopping their rotation. The rear wheels now attain the tractive resistance upon these fixed rollers 1, and immediately move over these rollers carrying the car off from the hoisting device. As the brake levers 46 were depressed, the fingers 63 were released and the hooks 62 were drawn into engagement with the pins 64 by the springs 65, thus holding the arms 4 and driving rollers 2 in lowered position. As the car moves backward, the axles thereof engage the upward extensions 5ª and 6ª on the lifting members and tip the same, together with their frames backward and as they reach the floor, the pins 44 engage the bell crank lever 37, tipping the same to their former position, and remeshing the racks 34 with the gears 35, so that the frame is ready to be raised when the car is again placed on the hoisting device.

What I claim is:—

1. An automatic hoisting device for motor vehicles comprising lifting members adapted to engage the motor vehicle to raise the same, and means for actuating said lifting members operated by frictional engagement with the driving wheels of the motor vehicle.

2. An automatic hoisting device for motor vehicles, comprising, lifting members adapted to engage such motor vehicle to raise and lower the same, means for actuating said lifting members operated by frictional engagement with the driving wheels of the automobile, means for stopping the operation of such operating mechanism when the motor vehicle has been raised to a certain predetermined height, and means for stopping the operation of said operating mechanism after the motor vehicle has been lowered to the floor.

3. An automatic hoisting device for motor vehicles comprising, a series of lifting units to raise and lower such motor vehicles, each unit being provided with a lifting member adapted to engage the under side of the automobile and mechanism for operating the same, power transmitting units to engage the tires of the driving wheels of the automobile, each power transmitting unit being provided with an idler roller and a driving roller, said driving rollers being adapted to rise and remain in frictional engagement with the tires of the driving wheels as the automobile is raised, and means for transmitting power from the driving rollers to the operating mechanism in the lifting units.

4. An automatic motor vehicle hoist comprising, power transmitting units adapted to be operated by the driving wheels of such motor vehicle, each power transmitting unit being provided with an idler roller and a driving roller and the driving rollers being adapted to rise and remain in frictional engagement with the tires of the driving wheels as the motor vehicle is raised, shafts to connect the corresponding idler rollers and driving rollers in the respective driving units so that they will rotate simultaneously, a series of lifting members to engage the motor vehicle to raise the same, and means for operating said lifting members actuated by the shaft to which the driving rollers are connected.

5. An automatic hoisting device for motor vehicles comprising, a series of lifting units, each of which is provided with a lifting member mounted in a pivoted frame, which is adapted to tip downward and lie close to the floor, means for raising each frame to vertical operative position, means for actuating the lifting member and power transmitting mechanism operated by frictional engagement with the driving wheels of the motor vehicle and connected by shafts and gears to the mechanism in each of the lifting units to actuate the same.

6. An automatic hoisting device for motor vehicles comprising, a series of lifting units located on the floor beneath such motor vehicle, each lifting unit being provided with a pivoted frame, a lifting member vertically slidable in the frame, a screw journaled in the lower end of the frame and threaded longitudinally into the lifting member, a bevel gear fixed to the lower end of the screw, a bevel pinion fixed to a shaft journaled in the base plate and adapted to mesh with said bevel gear when the said frame is in normal position, means for raising the frame to a vertical position and for releasing the same so that it may be tipped downward, and means operated by frictional engagement with the driving wheels of the automobile and connected by shafts and gears to the mechanism in the lifting units, for operating the same.

7. An automatic hoisting device for motor vehicles comprising, a series of lifting units located in the floor beneath such motor vehicle, each lifting unit being provided with a base plate, a frame pivotally attached to the base plate and normally supported in vertical position and adapted to be tipped downward to horizontal position, a lifting member vertically slidable in said frame and adapted to engage the under surface of the motor vehicle, a projection at the upper end of said lifting member adapted to be engaged by the motor vehicle as it moves backward to tip the frame backward, means for actuating the said lifting members, a spur gear fixed to a shaft journaled in bearings on the base plate, a rack bar pivotally connected at one end to the pivoted frame and provided on its under surface with teeth adapted to mesh with those of the said spur gear, a flange on said rack bar, a bell crank lever pivoted to the base, a depressing roller mounted on said bell crank and adapted to traverse the upper surface of said flange, when the bell crank is in one position, to hold the rack bar in mesh with the gear, a lifting roller also mounted on said bell crank and adapted to traverse the under surface of said flange when the bell crank is shifted to the opposite position, to lift the rack bar out of engagement with the gear, pins projecting from the side of the rack bar and adapted to alternately engage the bell crank to shift it from one position to the other, a spring to yieldably retain the bell crank in either position, and power transmitting mechanism operated by frictional engagement with the driving wheels of the motor vehicle and connected by shafts and gears to the operating mechanism in each lifting unit to actuate the same.

8. An automatic hoisting device for motor vehicles comprising, a power transmitting unit for each driving wheel adapted to rotatably support the said wheels, each unit being provided with a base plate, an idler roller journaled in bearings on the base plate, a pair of arms pivotally connected to the base plate and normally supported in horizontal position, a power transmitting roller journaled in the free ends of said arms, means for locking the said idler rollers against rotation and for releasing the same, means for retaining the pivoted arms and driving roller in lowered position and for releasing the same, means for yieldably thrusting the said arms and driving roller upward, and means for limiting the upward movement of said arms, a series of lifting units located on the floor beneath the automobile and adapted to engage the lower side thereof to raise the machine from the floor, and means for transmitting the rotation from the said driving rollers to each of the said lifting units to actuate the same.

9. An automatic hoisting device for motor vehicles comprising, a power transmitting unit for each of the driving wheels of such automobile adapted to rotatably support the same, each unit being provided with a base plate, an idler roller journaled in bearings on the base plate, a pair of arms pivotally connected to the base plate and normally supported in horizontal position, a driving roller journaled in the free ends of said arms and adapted to engage the tire of the driving wheel, a band brake surrounding one end of the idler roller, a brake lever pivoted to an extension on the base plate and having the band brake attached to it, a friction roller fixed to a shaft journaled in bearings on the base plate and adapted to frictionally engage the periphery of the driving roller when said roller is in lowered position, the periphery of said friction roller being provided with a depression, a cam fixed to the said shaft which carries the friction roller adapted when rotated to engage the free end of the said brake lever to depress the same and tighten the band brake about the idler roller, a pin projecting from one end of the friction roller, a rock shaft journaled in bearings on the base plate, a finger fixed to said rock shaft and adapted to engage the said pin on the friction roller, a lever fixed to said rock shaft, a push rod adapted to be depressed when the machine is lowered and released when the machine is raised, and also adapted, when depressed, to engage the said lever on the rock shaft, means for retaining the pivoted arms, together with the driving roller in lowered position and for releasing the same, means for yieldably thrusting the same upward to hold the driving roller in frictional engagement with the tire, and means for limiting the upward movement of said arms, lifting units located on the floor beneath the motor vehicle and adapted to engage the under surface of the same, and means for transmitting the rotation from the said driving rollers to each of the lifting units to actuate the same.

10. An automatic hoisting device for motor vehicles comprising, a series of lifting units located on the floor beneath such automobile, each lifting unit being provided with a base plate, a frame pivotally connected to the base plate normally supported in vertical position and adapted to be tipped backward to horizontal position, a lifting member vertically slidable in the frame, and adapted to engage the under surface of the motor vehicle to raise and lower the same, a projection at the upper end of said lifting member adapted to be engaged by the motor vehicle as it moves backward to tip the frame backward, means for actuating the said lifting member when the frame is in vertical position, and means for raising the frame to vertical position and for releasing the same so that it may be tipped backward, a power transmitting unit for each driving wheel of the automobile adapted to rotatably support the same, each unit being provided with a base plate, an idler roller journaled in bearings on said base plate, a pair of arms pivotally connected to the base plate and normally supported in horizontal position, a driving roller journaled in the free ends of said pivoted arms and adapted to frictionally engage the tire of the driving wheel, means for locking the idler rollers against rotation and for releasing the same, means for retaining the pivoted arms, together with the driving roller in lowered position and for releasing the same, means for yieldably thrusting the free ends of the pivoted arms together with the driving roller upward, and means for limiting the upward movement of said driving roller, a shaft connecting the corresponding idler rollers in the respective power transmitting units so that they will rotate simultaneously, a flexible shaft connecting the corresponding driving rollers in the respective power transmitting units so that they will rotate simultaneously, and means for trasmitting the rotation of the driving rollers to the operating mechanism in each of the lifting units to actuate the same substantially as and for the purpose described.

In testimony whereof I affix my signature in presence of two witnesses.

FRANK A. SIMONDS.

Witnesses:
HAROLD O. VAN ANTWERP,
PALMER A. JONES.